United States Patent
Ando

(10) Patent No.: US 11,794,773 B2
(45) Date of Patent: Oct. 24, 2023

(54) VEHICLE CONTROL INTERFACE AND VEHICLE SYSTEM

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/802,671

(22) Filed: Feb. 27, 2020

(65) Prior Publication Data

US 2020/0324788 A1 Oct. 15, 2020

(30) Foreign Application Priority Data

Apr. 10, 2019 (JP) ................................. 2019-074708

(51) Int. Cl.
*B60W 60/00* (2020.01)
*B60R 16/023* (2006.01)
(Continued)

(52) U.S. Cl.
CPC ....... *B60W 60/001* (2020.02); *B60R 16/0231* (2013.01); *B60W 10/04* (2013.01); *B60W 10/20* (2013.01); *B60W 50/00* (2013.01); *G05D 1/0088* (2013.01); *H04L 67/12* (2013.01); *B60W 2050/0005* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| 6,154,688 A | 11/2000 | Dominke et al. |
| 2005/0027402 A1* | 2/2005 | Koibuchi .......... B60W 30/1819 701/1 |

(Continued)

FOREIGN PATENT DOCUMENTS

| CN | 1608011 A | 4/2005 |
| CN | 107010075 A | 8/2017 |

(Continued)

OTHER PUBLICATIONS

Dec. 1, 2021 Office Action issued in U.S. Appl. No. 16/810,958.
(Continued)

*Primary Examiner* — Jelani A Smith
*Assistant Examiner* — Davin Seol
(74) *Attorney, Agent, or Firm* — Oliff PLC

(57) ABSTRACT

A vehicle control interface connects a vehicle platform including a first computer that performs travel control of a vehicle and an autonomous driving platform including a second computer that performs autonomous driving control of the vehicle. The vehicle control interface includes a control unit configured to execute: acquiring, from the second computer, a first control command including at least one of first data on designating acceleration or deceleration and second data on designating a travel track; converting the first control command into a second control command for the first computer; and transmitting the second control command to the first computer. The first control command is data for controlling the vehicle platform.

10 Claims, 7 Drawing Sheets

(51) Int. Cl.
  *B60W 10/04* (2006.01)
  *B60W 10/20* (2006.01)
  *B60W 50/00* (2006.01)
  *H04L 67/12* (2022.01)
  *G05D 1/00* (2006.01)

(56) References Cited

U.S. PATENT DOCUMENTS

| | | | |
|---|---|---|---|
| 2008/0288150 A1* | 11/2008 | Isogai | B60T 7/22 |
| | | | 701/70 |
| 2012/0109460 A1* | 5/2012 | Tokimasa | B60W 50/045 |
| | | | 701/1 |
| 2015/0234382 A1* | 8/2015 | Ju | G05D 1/021 |
| | | | 701/23 |
| 2015/0375740 A1* | 12/2015 | Okamura | B60W 30/146 |
| | | | 701/25 |
| 2017/0036677 A1* | 2/2017 | Blumentritt | B60L 7/18 |
| 2017/0158199 A1* | 6/2017 | Pallett | B60W 40/107 |
| 2017/0244594 A1* | 8/2017 | Shiota | H04W 12/122 |
| 2017/0334453 A1* | 11/2017 | Mimura | B60W 10/20 |
| 2018/0004964 A1 | 1/2018 | Litichever et al. | |
| 2018/0086336 A1 | 3/2018 | Jones et al. | |
| 2018/0162412 A1* | 6/2018 | Gao | B60W 30/143 |
| 2018/0211061 A1* | 7/2018 | Scheid | G07C 5/00 |
| 2018/0341266 A1 | 11/2018 | Morimura | |
| 2019/0359225 A1 | 11/2019 | Kanoh et al. | |
| 2019/0372975 A1* | 12/2019 | Schwindt | G08G 5/0021 |
| 2020/0148218 A1* | 5/2020 | Huang | G05D 1/0088 |
| 2020/0201324 A1* | 6/2020 | Darayan | G05D 1/0077 |
| 2020/0301420 A1* | 9/2020 | Demerly | B60W 30/143 |
| 2020/0324789 A1 | 10/2020 | Ando | |
| 2020/0331494 A1 | 10/2020 | Ando | |

FOREIGN PATENT DOCUMENTS

| | | |
|---|---|---|
| JP | H10-250417 A | 9/1998 |
| JP | 2003-191774 A | 7/2003 |
| JP | 2006-256457 A | 9/2006 |
| JP | 2008-279983 A | 11/2008 |
| JP | 2011-156955 A | 8/2011 |
| JP | 2018-016107 A | 2/2018 |
| JP | 2018-132015 A | 8/2018 |
| JP | 2018-198485 A | 12/2018 |
| JP | 2020-172168 A | 10/2020 |
| WO | 03/059680 A1 | 7/2003 |

OTHER PUBLICATIONS

Oct. 15, 2021 Office Action issued in U.S. Appl. No. 16/815,134.
U.S. Appl. No. 16/815,134, filed Mar. 11, 2020.
May 17, 2022 Notice of Allowance issued in U.S. Appl. No. 16/810,958.
Apr. 6, 2022 Office Action issued to U.S. Appl. No. 16/815,134.
Jul. 12, 2022 Supplemental Notice of Allowability issued to U.S. Appl. No. 16/810,958.

* cited by examiner

| DATA NAME | TYPE |
| --- | --- |
| DESIGNATING ACCELERATION OR DECELERATION | INPUT |
| DESIGNATING STEERING ANGLE | INPUT |
| CURRENT VEHICLE SPEED | OUTPUT |
| STEERING ANGLE STATE | OUTPUT |

PHYSICAL CONTROL AMOUNT (ACCELERATION OR DECELERATION)

PHYSICAL CONTROL AMOUNT (STEERING ANGLE)

VALUE OF PHYSICAL CONTROL AMOUNT PER TIME STEP

VEHICLE CONTROL INTERFACE AND VEHICLE SYSTEM

INCORPORATION BY REFERENCE

The disclosure of Japanese Patent Application No. 2019-074708 filed on Apr. 10, 2019 including the specification, drawings and abstract is incorporated herein by reference in its entirety.

BACKGROUND

1. Technical Field

The present disclosure relates to vehicle control.

2. Description of Related Art

Studies have been actively conducted on the autonomous driving of vehicles. For example, Japanese Unexamined Patent Application Publication No. 2018-132015 (JP 2018-132015 A) discloses a vehicle system in which an autonomous driving ECU having a sensing function for detecting the surroundings of a vehicle is provided in the vehicle in addition to an engine ECU, wherein and the autonomous driving ECU issues a command to the engine ECU via an in-vehicle network. As in the disclosure described in JP 2018-132015 A, it is possible to add an autonomous driving function to the vehicle by separately providing an ECU that manages vehicle power and an autonomous driving ECU without drastically changing the existing vehicle platform. In addition, the development, by third parties, of autonomous driving functions by can be expected.

SUMMARY

In a case where the autonomous driving ECU and the ECU that manages the vehicle power (for example, the engine ECU) are supplied by different vendors, compatibility may become an issue. Furthermore, if the autonomous driving ECU can also access unnecessary information, from among information flowing through the in-vehicle network, security may also become an issue.

The present disclosure has been made in consideration of the issues stated above, and is intended to provide a vehicle control interface that achieves both versatility and security.

A vehicle control interface according to the present disclosure connects a vehicle platform including a first computer that performs travel control of a vehicle and an autonomous driving platform including a second computer that performs autonomous driving control of the vehicle. The vehicle control interface includes a control unit configured to execute: acquiring, from the second computer, a first control command including at least one of first data on designating acceleration or deceleration and second data on designating a travel track; converting the first control command into a second control command for the first computer; and transmitting the second control command to the first computer. The first control command is data for controlling the vehicle platform.

Moreover, a vehicle system according to the present disclosure includes: a vehicle platform including a first computer that performs travel control of a vehicle; and a vehicle control interface configured to connect the vehicle platform and an autonomous driving platform including a second computer that performs autonomous driving control of the vehicle. The vehicle control interface includes a control unit configured to execute: acquiring, from the second computer, a first control command including at least one of first data on designating acceleration or deceleration and second data on designating a travel track; converting the first control command into a second control command for the first computer; and transmitting the second control command to the first computer. The first control command is data for controlling the vehicle platform.

Another aspect of the present disclosure relates to an information processing method executed by the vehicle control interface, a program for causing a computer to execute the information processing method executed by a computer, or a non-transitory computer-readable storage medium for storing the program.

According to the present disclosure, it is possible to provide a vehicle control interface that achieves both versatility and security.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Proposed is a configuration in which a vehicle platform, including a computer that controls vehicle power, is provided independently from an autonomous driving platform that makes determinations on autonomous driving, and both platforms are installed in a vehicle system. For example, the autonomous driving platform senses the surroundings of a vehicle, and transmits a control command to the existing vehicle platform based on the sensing results. With such a configuration, independent vendors can develop each platform, so that it is possible to promote the development of autonomous driving functions by third parties.

Meanwhile, various issues can occur in a case where platforms developed by different vendors are installed in the same vehicle system, that is, a vehicle power system and an autonomous driving system, that issues a control command to the power system, are connected to the same in-vehicle network. One of the potentially occurring issues is that commands for controlling the vehicle platform are different according to manufacturer and vehicle type. For example, the input or output of the engine ECU are different depending on the manufacturer and vehicle type, thus it is expensive to design an autonomous driving ECU compatible with all vehicle types. Further, since various information for controlling the vehicle flows through the in-vehicle network, it is not desirable to allow that the autonomous driving platform (manufactured by a third party not directly related to the vehicle platform) can have unlimited access to those pieces of information.

Figure 1:
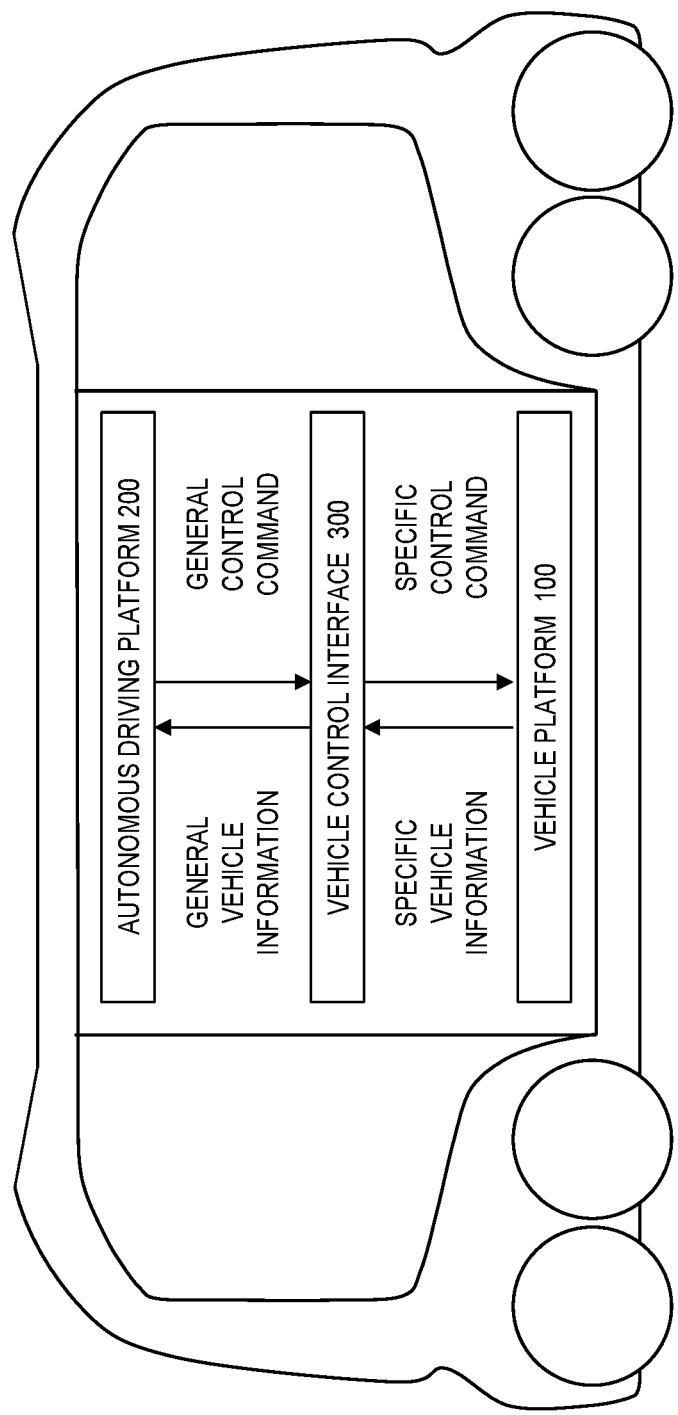
FIG. 1 is a schematic diagram of a vehicle system according to a first embodiment.

Therefore, the vehicle system according to the present embodiment is configured such that the vehicle platform and the autonomous driving platform are connected via the vehicle control interface to relay information. FIG. 1 is a schematic diagram of the vehicle system according to the present embodiment. A vehicle platform 100 is a platform including a first computer (for example, an engine ECU or the like) that performs travel control of a vehicle. An autonomous driving platform 200 is a platform including a second computer (for example, an autonomous driving ECU) that performs autonomous driving control of the vehicle. The autonomous driving platform 200 may have devices for sensing the surroundings of the vehicle, and devices for generating a travel plan based on the sensing results.

A vehicle control interface 300 is a device that connects the vehicle platform 100 and the autonomous driving platform 200 and relays information that the vehicle platform and the autonomous driving platform input to and output from each other. In particular, the vehicle control interface 300 is configured to include a control unit, in which a first control command, which is data for controlling the vehicle platform and includes at least one of first data relating to designating acceleration or deceleration and second data relating to designation of a travel track, is acquired from the second computer, the first control command is converted into a second control command for the first computer, and the second control command is transmitted to the first computer.

The first data is data relating to designating acceleration or deceleration of the vehicle, and the second data is data relating to designation of a travel track. The first data may be, for example, data which designates an amount of change in speed (acceleration or deceleration) per unit of time, or a target speed. In addition, the second data may be, for example, data which designates a steering angle. The second data may also be data which designates a travel track.

The first control command is generated as a general command not specific to the first computer provided in the vehicle. The control unit converts the first control command into the second control command which is data specific to the first computer. According to this configuration, it is possible to convert a general command into a command specific to a vehicle type or a manufacturer.

In a case where the first control command includes data other than the first and second data, the control unit may discard the data without converting the data. According to such a configuration, in a case in which data that should not be transmitted to the vehicle platform 100 (for example, a command for a vehicle component that is not supposed to be accessed by the autonomous driving platform) is transmitted, such data can be appropriately filtered.

The vehicle control interface may further include a storage unit configured to store conversion information that is a rule for converting the first control command and the second control command, wherein the control unit converts the first control command into the second control command based on the conversion information. For example, the storage unit stores the rule (specific to the vehicle) for converting the first control command into the second control command in advance, and generates the control command to be transmitted to the vehicle platform based on data transmitted from the autonomous driving platform. According to such a configuration, it is possible to introduce the autonomous driving platform regardless of manufacturer or vehicle type.

The control unit may calculate a range of acceleration or deceleration or a range for the amount of change of a steering angle that can be requested to the first computer based on information acquired from the vehicle platform.

The range of speed change (acceleration or deceleration) per unit of time and the range of steering angle change (angular velocity, or the like) per unit of time, each of which can be requested to the vehicle platform, depend on vehicle state and traveling state (for example, road conditions, traffic situation, engine load conditions, the number of occupants, and the like). Therefore, the vehicle control interface may calculate these based on information acquired from the vehicle platform. According to such a configuration, it is possible to determine whether the data transmitted from the autonomous driving platform is appropriate or not. Additionally, the appropriate range can be notified to the autonomous driving platform.

The control unit may correct, in a case in which the acceleration or deceleration designated by the first data exceeds the range that can be requested to the first computer, the range of the acceleration or deceleration in a predetermined range. The control unit may correct, in a case in which the amount of change in the steering angle designated by the second data exceeds the range that can be requested to the first computer, the range of the amount of change in the steering angle in a predetermined range.

As stated above, in a case where an inappropriate acceleration or deceleration or amount of change in steering angle is designated by the autonomous driving platform, the vehicle control interface may automatically perform correction. According to this configuration, it is possible to ensure safety.

The control unit may notify the second computer of the range of acceleration or deceleration or the range of the amount of change in steering angle that can be requested to the first computer. As stated above, information necessary for making determinations during the autonomous driving may be notified to the autonomous driving platform.

First Embodiment

An outline of the vehicle system according to the first embodiment will be described. As shown in FIG. 1, the vehicle system according to the present embodiment is configured by the vehicle platform 100, the autonomous driving platform 200, and the vehicle control interface 300. The vehicle platform 100 is a conventional vehicle platform. The vehicle platform 100 operates based on the control command specific to the vehicle, and generates vehicle information specific to the vehicle. The control command and the vehicle information are encapsulated by, for example, a CAN frame that flows through the in-vehicle network.

The autonomous driving platform 200 has a device for sensing the surroundings of the vehicle, and issues the control command that is not specific to a vehicle type or a manufacturer. Furthermore, vehicle information that is not specific to a vehicle type or a manufacturer is acquired. The vehicle control interface 300 mutually converts the control command specific to the vehicle (that is, a control command that can be interpreted by the vehicle platform 100) into a control command not specific to the vehicle (that is, a control command generated by the autonomous driving platform 200). Furthermore, the vehicle control interface 300 also mutually converts the vehicle information specific to the vehicle (that is, vehicle information generated by the vehicle platform 100) into vehicle information not specific to the vehicle (that is, vehicle information that can be interpreted by the autonomous driving platform 200).

Figure 2:
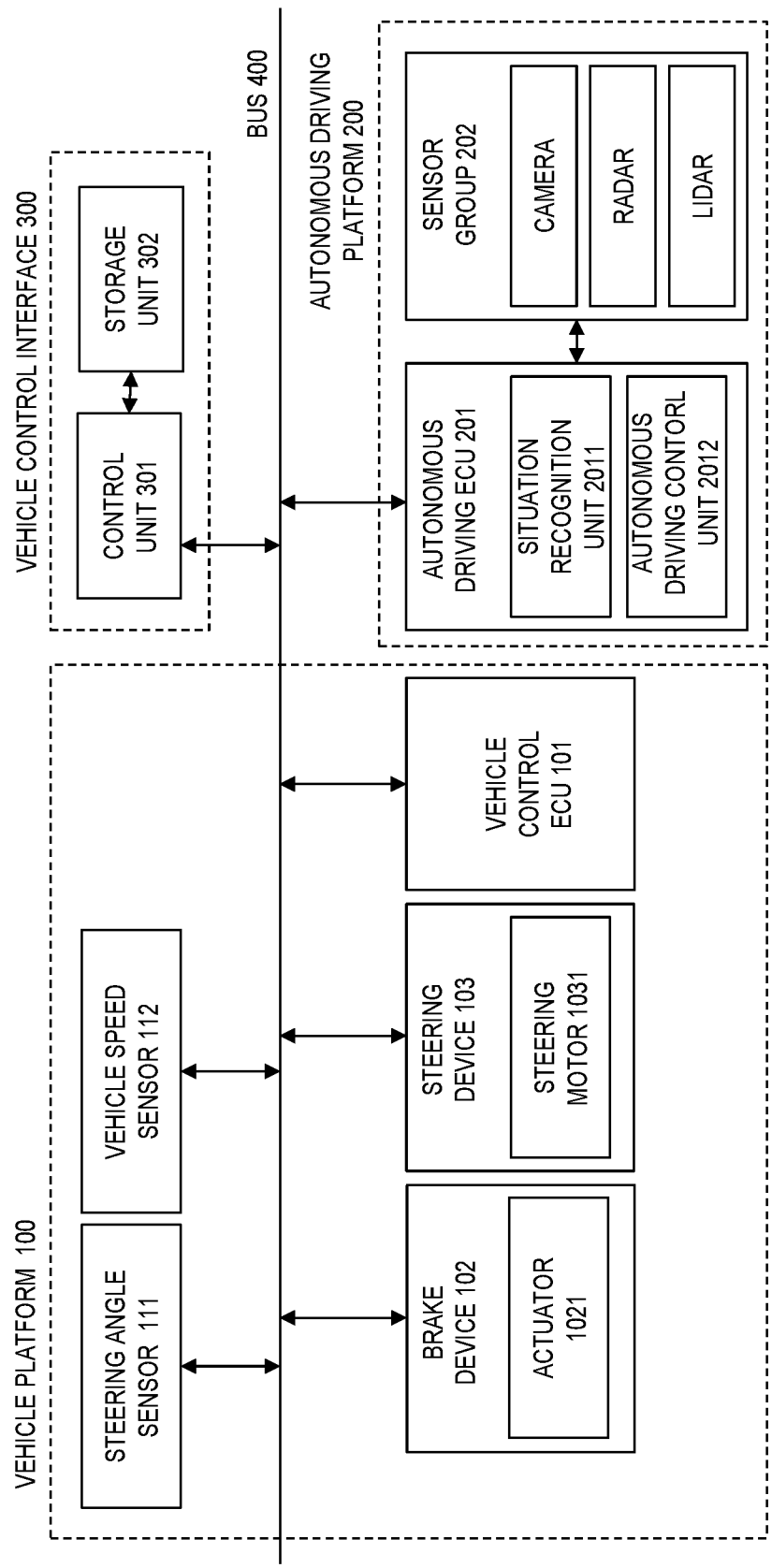
FIG. 2 is a block diagram schematically showing one example of components provided in the system.

Next, components of the system will be described in detail. FIG. 2 is a block diagram schematically showing one example of a configuration of the vehicle system which is shown in FIG. 1. The vehicle system includes the vehicle platform 100, the autonomous driving platform 200, and the vehicle control interface 300, and each component is communicably connected by a bus 400.

The vehicle platform 100 includes a vehicle control ECU 101, a brake device 102, a steering device 103, a steering angle sensor 111, and a vehicle speed sensor 112. In this example, a vehicle with an engine is exemplified, but an electric vehicle may be used. In this case, the engine ECU can be replaced with an ECU that manages the vehicle power. Furthermore, the vehicle platform 100 may be equipped with ECUs and sensors which are different from those illustrated.

The vehicle control ECU 101 is a computer that controls components of the vehicle (for example, engine system components, power train system components, brake system components, electrical system components, and body system components). The vehicle control ECU 101 may be a set of computers. The vehicle control ECU 101 controls rotation speed of an engine, for example, by performing fuel injection control. The vehicle control ECU 101 can control the engine speed based on, for example, the control command (for example, a command for designating a degree of throttle opening) generated by an occupant's operation (for example, operating an accelerator pedal).

In a case in which the vehicle is an electric vehicle, the vehicle control ECU 101 can control a rotation speed of a motor by controlling a drive voltage, current, drive frequency, and the like. In this case, the rotational speed of the motor can also be controlled based on the control command generated by the occupant's operation, as in a case of an internal combustion vehicle. Furthermore, it is possible to control a regenerative current based on a pressing force on a brake pedal and a control command indicating a degree of regenerative braking. In a case where the vehicle is a hybrid vehicle, control for both the engine and the motor may be carried out.

In addition, the vehicle control ECU 101 can control a braking force by a mechanical brake by controlling an actuator 1021 included in the brake device 102 described later. The vehicle control ECU 101 can control a brake hydraulic pressure by driving the actuator 1021 based on, for example, the control command (for example, a command indicating the pressing force on the brake pedal) generated by an occupant's operation (for example, operating the brake pedal).

Further, the vehicle control ECU 101 can control a steering angle or a steering wheel angle by controlling a steering motor 1031 included in the steering device 103 described later. The vehicle control ECU 101 can control a steering angle of the vehicle by driving a steering motor 1031 based on, for example, the control command (for example, a command indicating the steering angle) generated by the occupant's operation (for example, steering operation).

The control command may be generated in the vehicle platform 100 based on the occupant's operation, or may be generated outside the vehicle platform 100 (for example, by a device that controls autonomous driving).

The brake device 102 is a mechanical brake system provided in the vehicle. The brake device 102 includes an interface (such as the brake pedal), the actuator 1021, a hydraulic system, a brake cylinder, and the like. The actuator 1021 is a device for controlling the hydraulic pressure in the brake system. The braking force of the mechanical brake can be ensured by controlling the hydraulic pressure of the brake by the actuator 1021 which has received the command from the vehicle control ECU 101.

The steering device 103 is a steering system provided in the vehicle. The steering device 103 includes an interface (such as the steering wheel, the steering motor 1031, a gear box, and a steering column). The steering motor 1031 is a device for assisting the steering operation. A force required for the steering operation can be reduced by driving the steering motor 1031 which has received the command from the vehicle control ECU 101. Furthermore, it is possible to automate, by driving the steering motor 1031, the steering operation without depending on the occupant's operation.

The steering angle sensor 111 is a sensor that detects a steering angle acquired by the steering operation. A detected value acquired by the steering angle sensor 111 is transmitted to the vehicle control ECU 101 as needed. In the present embodiment, a numerical value that directly represents a turning angle of a tire is used as the steering angle, but a value that indirectly represents the turning angle of a tire may also be used. The vehicle speed sensor 112 is a sensor that detects vehicle speed. A detected value acquired by the vehicle speed sensor 112 is transmitted to the vehicle control ECU 101 as needed.

The autonomous driving platform 200 will be described hereinbelow. The autonomous driving platform 200 is a device that senses the surroundings of the vehicle, generates a travel plan based on the sensing results, and issues a command to the vehicle platform 100 according to the plan. The autonomous driving platform 200 may be developed by a manufacturer or a vendor different from that of the vehicle platform 100. The autonomous driving platform 200 includes an autonomous driving ECU 201 and a sensor group 202.

The autonomous driving ECU 201 is a computer that controls the vehicle by making determinations on autonomous driving, based on data acquired from the sensor group 202 described later, and by communicating with the vehicle platform 100. The autonomous driving ECU 201 is configured by, for example, a CPU (central processing unit). The autonomous driving ECU 201 includes two functional modules, a situation recognition unit 2011 and an autonomous driving control unit 2012. Each functional module may be implemented by executing a program stored in a storage unit such as a ROM (read only memory) by a CPU.

The situation recognition unit 2011 detects an environment around the vehicle based on data acquired by sensors included in the sensor group 202 described later. Detection targets include, for example, but are not limited to, the number and positions of lanes, the number and positions of vehicles existing around the host vehicle, the number and positions of obstacles (for example, pedestrians, bicycles, structures, buildings, and the like) existing around the host vehicle, road structures, road signs, and the like. Any detection target may be used as long as it is necessary for autonomous traveling. Data relating to the environment (hereinafter referred to as "environment data"), detected by the situation recognition unit 2011, is transmitted to the autonomous driving control unit 2012.

An autonomous driving control unit 2012 uses the environment data generated by the situation recognition unit 2011 to control traveling of the host vehicle. For example, a travel track of the host vehicle is generated based on the environment data, and the acceleration or deceleration and the steering angle of the vehicle are determined such that the vehicle travels along the travel track. Information determined by the autonomous driving control unit 2012 is transmitted to the vehicle platform 100 (vehicle control ECU 101) via the vehicle control interface 300 described later. A well-known method can be adopted as a method for allowing the vehicle to autonomously travel.

In the present embodiment, the autonomous driving control unit 2012 generates only a command related to acceleration or deceleration of the vehicle and a command related to steering of the vehicle as the first control command. Hereinafter, a command related to acceleration or deceleration of the vehicle is referred to as an acceleration or deceleration command, and a command related to steering of the vehicle is referred to as a steering command. The first control command including the acceleration or deceleration command and the steering command is a general command that does not depend on a vehicle type or a manufacturer. In the present embodiment, the acceleration or deceleration command is information designating acceleration or deceleration of the vehicle, and the steering command is information designating a steering angle of the steering wheel of the vehicle.

The sensor group 202 is a unit configured to sense the surroundings of the vehicle, and typically includes a monocular camera, a stereo camera, a radar, a LIDAR, a laser scanner, and the like. The sensor group 202 may include a device for acquiring a current location of the vehicle (such as a GPS module) in addition to those for sensing the surroundings of the vehicle. Information acquired by the sensors included in the sensor group 202 is transmitted to the autonomous driving ECU 201 (situation recognition unit 2011) as needed.

Next, the vehicle control interface 300 will be described. The control command handled by the vehicle control ECU 101 in the present embodiment is specific to a vehicle and a manufacturer. On the other hand, the autonomous driving platform 200 is an apparatus developed by a third party and is expected to be installed in various vehicle types of various manufacturers. That is, it is expensive to connect both components to the same in-vehicle network. Therefore, in the present embodiment, the vehicle control interface 300 is used as a device that converts and relays data exchanged between the vehicle control ECU 101 and the autonomous driving ECU 201.

Figures 3, 4:
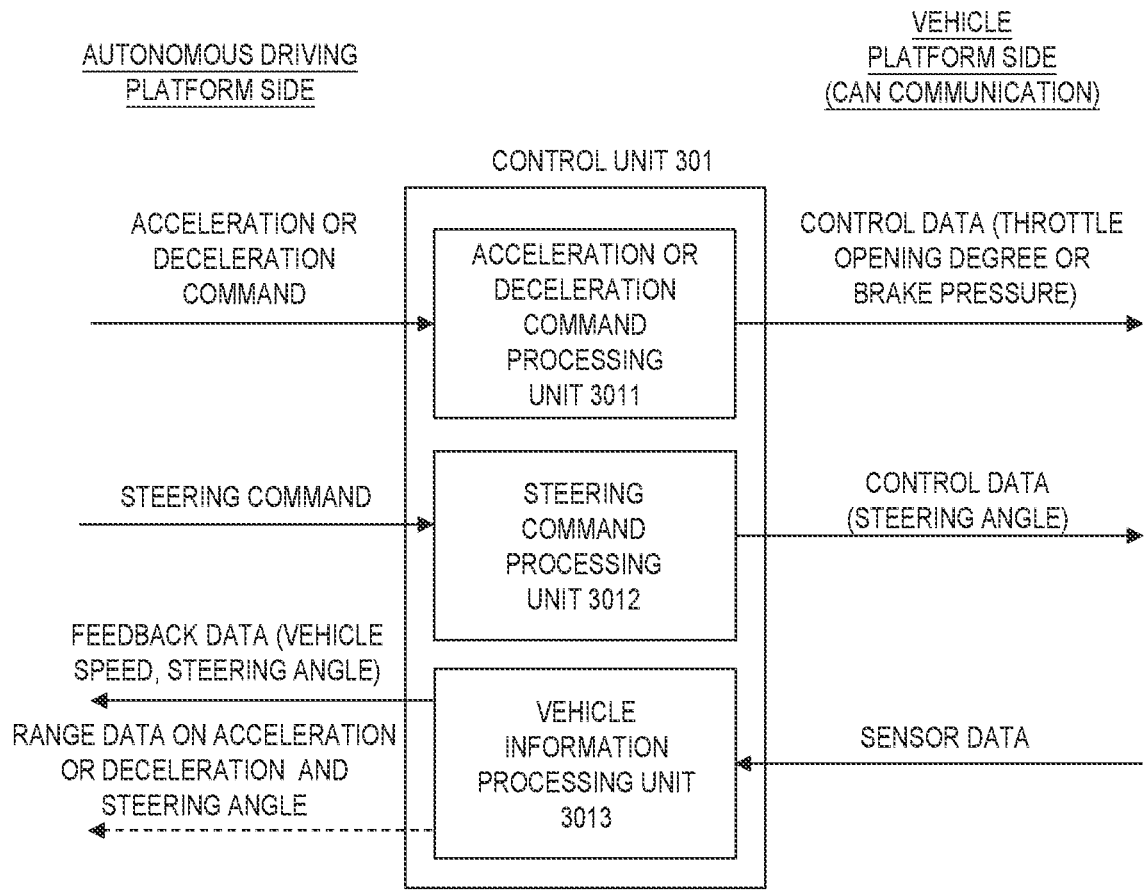
FIG. 3 is a diagram illustrating data input and output by a vehicle control interface.
FIG. 4 is a diagram illustrating data to be converted.

A control unit 301 is a computer that mutually converts the control command handled by the vehicle control ECU 101 into the control command handled by the autonomous driving ECU 201. The control unit 301 is configured by, for example, a CPU (central processing unit). As shown in FIG. 3, the control unit 301 includes three functional modules, an acceleration or deceleration command processing unit 3011, a steering command processing unit 3012, and a vehicle information processing unit 3013. Each functional module may be implemented by executing, by a CPU, a program stored in a storage unit 302 described later.

The acceleration or deceleration command processing unit 3011 receives the acceleration or deceleration command from the autonomous driving ECU 201, and converts the acceleration or deceleration command into data (second control command; hereinafter "control data") that can be interpreted by the vehicle control ECU 101. In particular, the acceleration or deceleration (for example, +3.0 km/h/s) designated by the acceleration or deceleration command is converted into the data indicating a degree of throttle opening, or into the data indicating a brake pressure. The converted control data is transmitted in a protocol or format specific to the vehicle platform 100. A conversion process is carried out using conversion information stored in the storage unit 302 described later. The processing will be described later.

In this example, a degree of throttle opening and a brake pressure are exemplified as the control data. However, the control data may be other data as long as it relates to the acceleration or deceleration of the vehicle. For example, a target rotational speed or a current value of the motor may be used.

The steering command processing unit 3012 receives the steering command from the autonomous driving ECU 201, and converts the steering command into the control data that can be interpreted by the vehicle control ECU 101 using the conversion information. In particular, the data is converted into data indicating a steering angle, which is specific to the vehicle platform 100. In this example, a turning angle of a tire is exemplified as the steering angle, but the control data may be other data as long as it relates to steering of the vehicle. For example, the control data may directly or indirectly represent a steering wheel angle, a percentage of the maximum turning angle, or the like.

The vehicle information processing unit 3013 receives information on a vehicle state from the vehicle control ECU 101 and converts the information into information that can be interpreted by the autonomous driving ECU 201 (information not specific to a vehicle type). In particular, the information transmitted in a protocol or format specific to the vehicle platform 100 is converted into information in a general format (hereinafter referred to as feedback data). Hereinafter, the information on a vehicle state is referred to as sensor data. The sensor data is based on information acquired by the steering angle sensor 111 and the vehicle speed sensor 112, for example, and is transmitted to the in-vehicle network by the vehicle control ECU 101. The sensor data may be, for example, any data as long as feedback to the autonomous driving ECU 201 is possible, such as vehicle speed information, information on a turning angle of a tire, and information on a steering angle. In the present embodiment, the vehicle information processing unit 3013 converts sensor data relating to current vehicle speed and a steering angle state.

The storage unit 302 is a unit configured to store information, which is configured by a storage medium such as a RAM, a magnetic disk, a flash memory or the like. The storage unit 302 stores information for converting the acceleration or deceleration command and the steering command, which are generated by the autonomous driving ECU 201 (autonomous driving control unit 2012), into the control data that can be interpreted by the vehicle control ECU 101 (hereinafter referred to as conversion information), and vice versa. The conversion information further includes information for converting sensor data specific to the vehicle into the feedback data.

The conversion information includes, for example, a configuration of control data input or output to or from the vehicle control ECU 101, parameters thereof, and a table or a mathematical formulas for converting input values into parameters. Furthermore, the conversion information consists of the configuration of sensor data output from the vehicle control ECU 101, its parameters, tables for converting the parameters into physical values, mathematical formulas, and the like.

FIG. 4 is a diagram showing types of data converted by the conversion information. In the drawing, "Input" indicates that it is data from the autonomous driving ECU 201 to the vehicle control ECU 101, and "Output" indicates that it is data from the vehicle control ECU 101 to the autonomous driving ECU 201. As stated above, the commands relating to acceleration or deceleration and steering angle are transmitted from the autonomous driving ECU 201 to the vehicle control ECU 101, and data relating to current vehicle speed and a steering angle state is transmitted from the vehicle control ECU 101 to the autonomous driving ECU 201. In a case where data other than that shown in FIG. 4 is transmitted to the vehicle control interface 300, the data is discarded.

In the vehicle system according to the present embodiment, communication between the vehicle platform 100 and the autonomous driving platform 200 is carried out with a configuration stated above.

Figure 5:
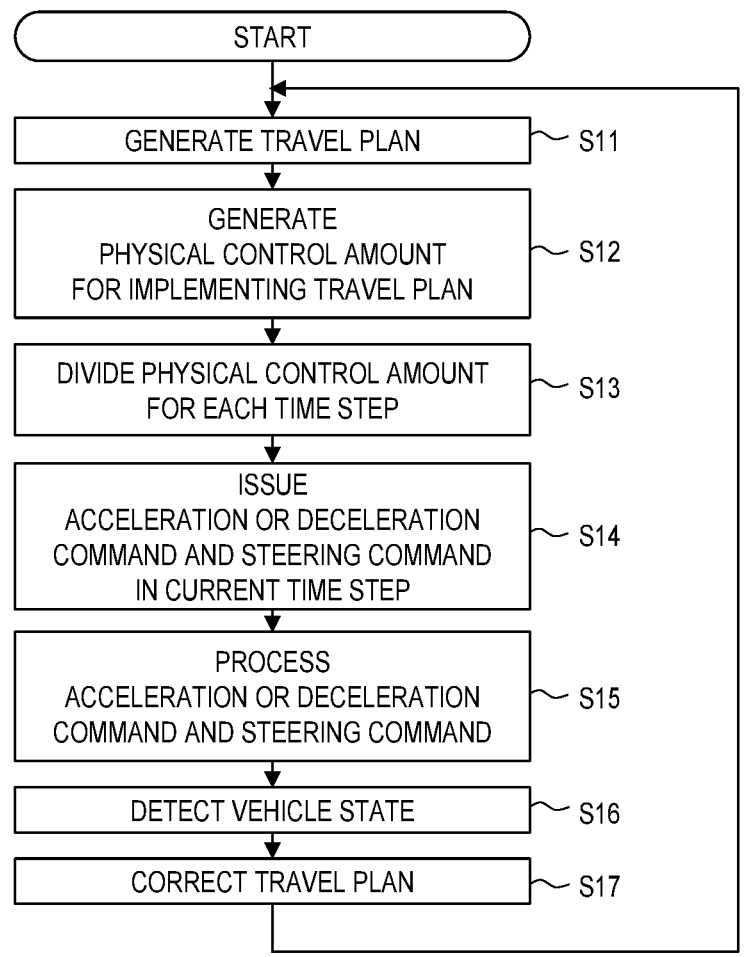
FIG. 5 is a flowchart illustrating processing executed in the first embodiment.
Figure 6:
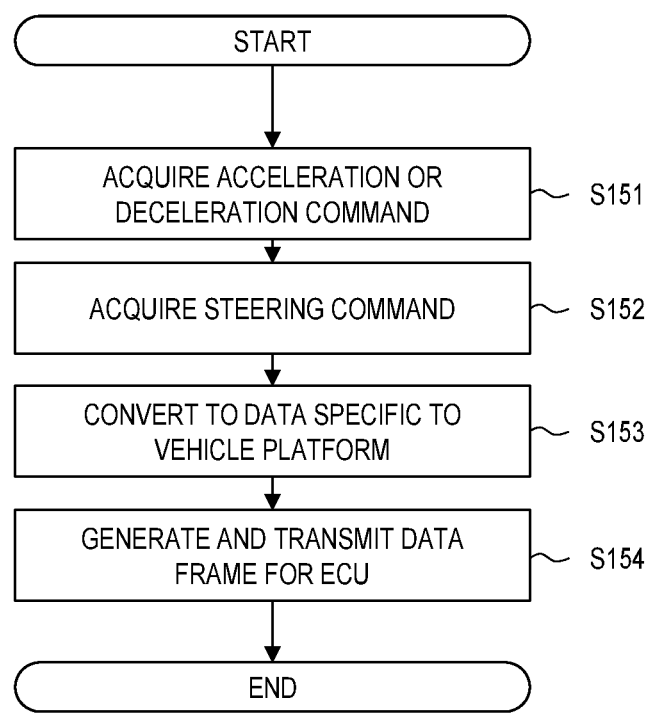
FIG. 6 is a flowchart illustrating processing executed in the first embodiment.

Next, a processing performed by the vehicle system according to the present embodiment will be described with reference to FIGS. 5 and 6, which are processing flowcharts. The processing shown in FIG. 5 is executed by the autonomous driving platform 200 at predetermined intervals.

Figure 7:
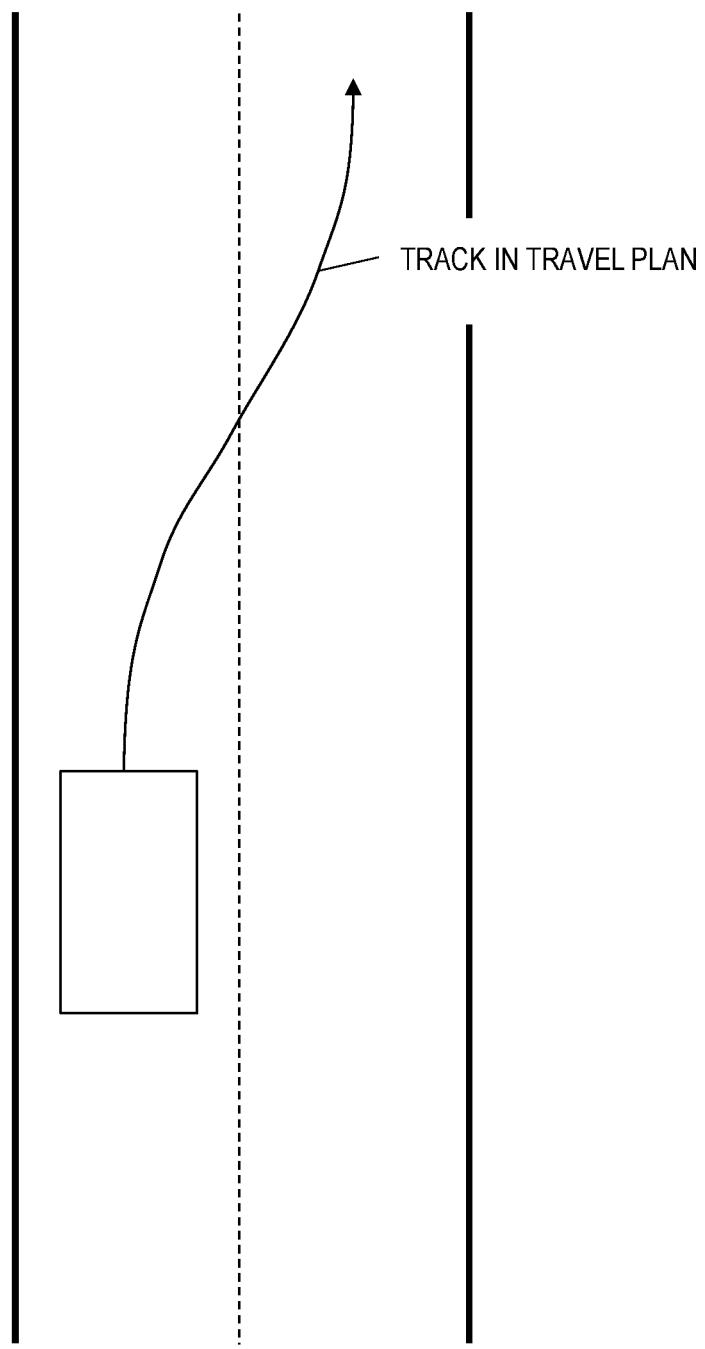
FIG. 7 is a diagram illustrating a vehicle travel plan.

In step S11, the autonomous driving ECU 201 generates a travel plan based on the information acquired from the sensor group 202. The travel plan is data indicating behavior of the vehicle in a predetermined interval. For example, as illustrated in FIG. 7, when the travel plan in which a vehicle traveling in a first lane moves to a second lane is generated, a travel track as illustrated is generated. The travel plan may include a travel track of the vehicle or may include information relating to acceleration or deceleration of the vehicle. The travel plan may also be generated based on information other than the exemplified information. For example, it may be generated based on a departure place, a transit point, a destination, map data, and the like.

Figure 8A:
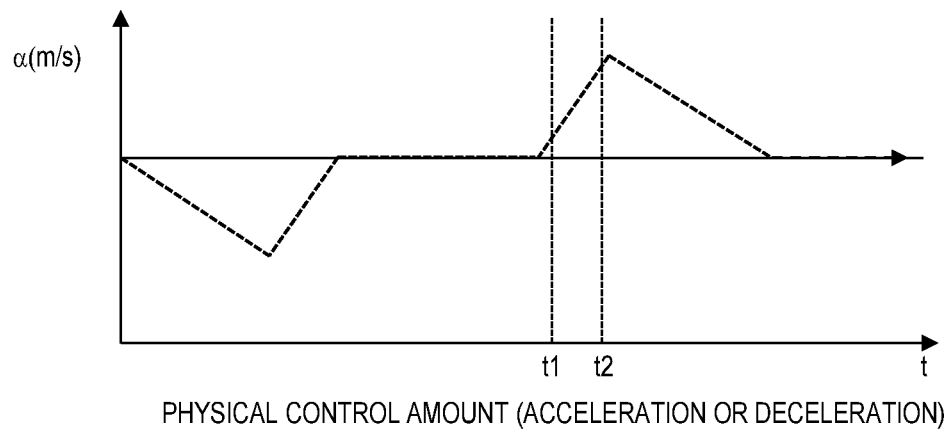
FIG. 8A is a diagram illustrating an amount of physical control (acceleration or deceleration) of a vehicle.
Figure 8B:
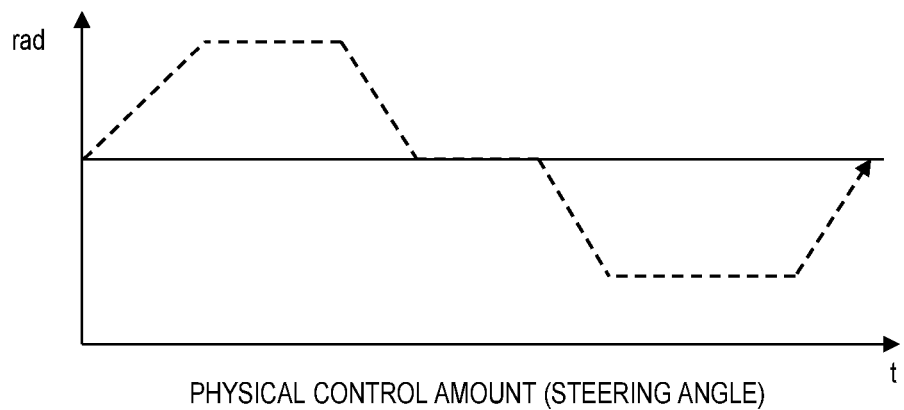
FIG. 8B is a diagram illustrating an amount of physical control (steering angle) of the vehicle.

In step S12, the autonomous driving ECU 201 generates an amount of physical control for implementing the travel plan. In the present embodiment, two types of an amount of physical control, i.e. an amount of physical control for acceleration or deceleration and an amount of physical control for a steering angle, are generated. FIG. 8A is a time chart showing an amount of control for acceleration or deceleration, and FIG. 8B is a time chart showing an amount of control for a steering angle. Each value may be generated based on a parameter set in advance, such as a relationship between the vehicle speed and the maximum steering angle, a relationship between the traveling environment and the acceleration or deceleration (steering angle), or a period of time required to complete the operation (for example, lane change).

Figure 8C:
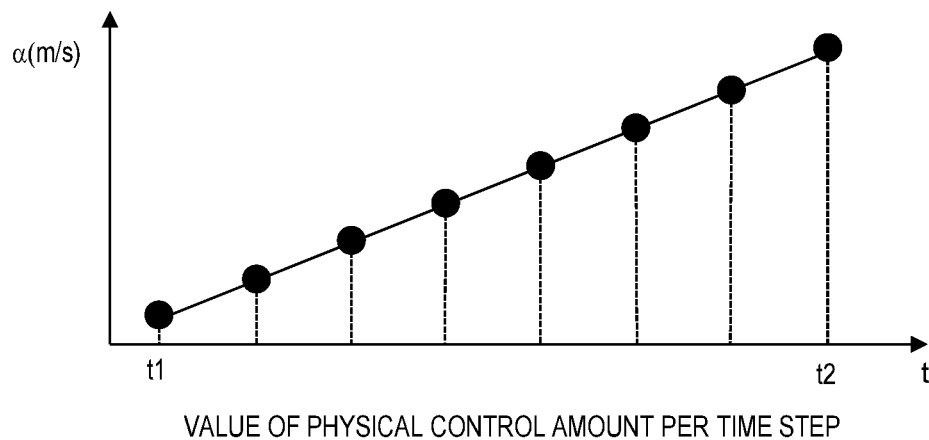
FIG. 8C is a diagram illustrating a value of the amount of physical control (acceleration or deceleration) of the vehicle for each time step.

In step S13, the autonomous driving ECU 201 divides each of the generated amounts of physical control into a plurality of time steps. The time step can be, for example, 100 milliseconds, but is not limited thereto. FIG. 8C shows an example in which the amount of physical control for the generated acceleration or deceleration is divided into seven steps during a period from time $t_1$ to time $t_2$.

In step S14, the autonomous driving ECU 201 issues the acceleration or deceleration command and the steering command based on the change in the amount of physical control from a current time step $t_n$ to a next time step $t_{n+1}$. For example, when one time step is 100 milliseconds and +2.0 km/h/s is designated as the acceleration or deceleration, an acceleration or deceleration command for designating a change of 0.2 km/h per time step is generated. For example, when it is designated to change the steering angle by 20 degrees over 2 seconds, a steering command for designating a change of 0.1 degree per time step is generated. The generated acceleration or deceleration command and steering command are input to the control unit 301 of the vehicle control interface 300.

In step S15, the vehicle control interface 300 (control unit 301) processes the acquired acceleration or deceleration command and steering command. FIG. 6 is a diagram illustrating the processing in step S15 in detail. In step S151, the acceleration or deceleration command processing unit 3011 acquires the acceleration or deceleration command transmitted from the autonomous driving ECU 201. Similarly, in step S152, the steering command processing unit 3012 acquires the steering command transmitted from the autonomous driving ECU 201.

In step S153, the control unit 301 performs data conversion. In particular, the acceleration or deceleration command processing unit 3011 performs mutual conversion between the acceleration or deceleration command and the control data based on the conversion information stored in the storage unit 302. The control data to be converted is data instructing a degree of throttle opening or data which designates a brake pressure. Moreover, the steering command processing unit 3012 performs mutual conversion between the steering command and the control data based on the conversion information stored in the storage unit 302. The control data to be converted is data instructing a steering angle (turning angle of a tire).

In step S154, the generated control data is transmitted to the vehicle control ECU 101. In this step, for example, the control data generated in step S153 is encapsulated in a data frame transmitted or received by the in-vehicle network, and transmitted to the vehicle control ECU 101 as a destination. Furthermore, in step S15, in a case where the vehicle control interface 300 receives data other than that shown in FIG. 4, the data is discarded.

The description will be continued returning to FIG. 5. Step S16 is a step in which the autonomous driving ECU 201 senses a vehicle state after transmitting the control data. In this step, the sensor data transmitted from the vehicle control ECU 101 is converted by the vehicle control interface 300, based on the conversion information, and then relayed to the autonomous driving ECU 201. The autonomous driving ECU 201, receiving such data, determines whether the vehicle is in a desired state or not.

Since the behaviors of the vehicle are influenced by current engine load, road conditions (for example, gradient), and the like, in the present embodiment, the autonomous driving ECU 201 receives feedback of the sensor data, and determines whether a desired amount of physical control is acquired or not. The sensor data is acquired by the vehicle information processing unit 3013, converted into the feedback data (data indicating a current vehicle speed and a steering angle), and then transmitted to the autonomous driving ECU 201. FIGS. 3 and 4 show exemplified data indicating a current vehicle speed and a steering angle as feedback data, but the feedback data is not limited to this. For example, the feedback data may include data relating to factors that affect vehicle behaviors, such as tire turn angle, steering angle, angular velocity, engine load, road gradient (tilt), the number of occupants, loading capacity, road conditions, and traffic situation.

In step S17, the autonomous driving ECU 201 corrects the travel plan based on the received feedback data. For example, if the feedback data indicates that the engine load is high and the requested acceleration cannot be acquired, the travel plan is corrected so that higher acceleration can be acquired. In addition, although the case in which the travel plan is corrected is given in this example, there may also be a case in which the travel control may not be changed, but the physical control amount for implementing the travel plan may be corrected.

In the vehicle system according to the first embodiment, by performing the processing stated above, it is possible to perform appropriate vehicle travel control in accordance with the vehicle state. In particular, by defining data to be relayed by the vehicle control interface 300 as the command related to acceleration or deceleration and the command related to steering and filtering other commands, it is possible to prevent access to unnecessary vehicle functions and to ensure safety. Furthermore, by preparing the conversion information, the autonomous driving platform 200 can be applied to various vehicle types without changes.

In the description of the present embodiment, the autonomous driving ECU 201 corrects the difference between the actual state of the vehicle and the ideal state of the vehicle based on the feedback data. However, the vehicle control interface 300 may also execute the correction. For example, the feedback data generated by the vehicle information processing unit 3013 may be input to the acceleration or deceleration command processing unit 3011 (steering command processing unit 3012) so that the acceleration or deceleration command processing unit 3011 (steering command processing unit 3012) automatically corrects the control data. In addition, the autonomous driving ECU 201 may generate data which designates an amount to be corrected independently from the acceleration or deceleration command and the steering command and may transmit such data to the vehicle control interface 300.

In the description of the present embodiment, the autonomous driving ECU 201 transmits two types of commands, i.e. the acceleration or deceleration command and the steering command, to the vehicle control interface 300, but other information may be transmitted as additional information. Furthermore, the vehicle control interface 300 may generate the control data to be transmitted to the vehicle control ECU 101 based on the additional information. In the description of the embodiment, the steering angle (turning angle of a tire) is used as the steering command. However, the steering command may be information on the track of a vehicle itself.

Second Embodiment

In the first embodiment, the vehicle control interface 300 performs mutual conversion of the data based on the conversion information stored in the storage unit 302. However, depending on a vehicle state, it may not be appropriate to convert the command transmitted from the autonomous driving platform 200 without changing the command. A second embodiment is an embodiment in which the ranges of the acceleration or deceleration and the steering angle are restricted in order to resolve such an issue.

A configuration of the vehicle system according to the second embodiment is the same as the that of the first embodiment except that the vehicle control interface 300 (vehicle information processing unit 3013) has functions of generating information (hereinafter, range information) on ranges of acceleration or deceleration and a steering angle, which can be designated, based on the sensor data acquired from the vehicle platform, and notifying the autonomous driving platform of the range information.

In the second embodiment, the vehicle information processing unit 3013 calculates the ranges of the acceleration or deceleration and the steering angle which can be designated, based on the acquired sensor data, and notifies the autonomous driving ECU 201 of those ranges. For example, the acceleration or deceleration of the vehicle that can be realized may vary depending on the number of occupants, loading capacity, engine load conditions, road surface conditions, and the like. In addition, the range of the steering angle that can be realized may vary depending on vehicle speed, road conditions, traffic situation, and the like. By calculating these ranges and notifying the autonomous driving ECU 201 as to the range data, it is possible to perform appropriate control.

Examples of the notified range information include the following data: (1) a range of acceleration or deceleration that can be designated (lower limit value and upper limit value), (2) a range of steering angle that can be designated (left angle and right angle), (3) a range of the amount of change in steering angle (angular velocity) that can be designated, and (4) a range of lateral acceleration or lateral jerk. Such information is estimated and generated based on the sensor data. A rule for generating the range information is stored in the storage unit 302 in advance.

The range information generated by the vehicle control interface 300 is transmitted to the autonomous driving ECU 201 and used in steps S11 to S12. For example, a physical control amount is generated in step S12 so that acceleration or deceleration, a steering angle, and an angular velocity of the steering angle fall within the notified range. Alternatively, in step S11, a travel plan is generated so that the physical control amount does not fall outside the range.

Furthermore, in the second embodiment, in a case where the acceleration or deceleration command and the steering command generated by the autonomous driving ECU 201 exceed the ranges stated above, those commands are corrected. For example, when the acceleration or deceleration command and the steering command, generated by the autonomous driving ECU 201, include values exceeding the upper limit value (lower limit value), the control data is generated assuming that the upper limit value (lower limit value) is designated. Consequently, it is possible to control the vehicle only within a range that the vehicle regards as being safe.

Additionally, in a case in which a correction occurs based on the range information, the feedback transmitted to the autonomous driving ECU 201 may include that the correction has occurred. Consequently, the autonomous driving ECU 201 may regenerate the travel plan.

In the description of the present embodiment, the vehicle information processing unit 3013 generates information on vehicle speed and a steering angle as the range data, but other information may be attached. For example, an estimated value of acceleration or deceleration, when a throttle is fully closed, may be attached to the range data.

Modified Examples

The embodiments stated above are mere examples, and the present disclosure can be implemented with appropriate modifications within a scope not departing from the gist thereof. For example, the processing and units described in the present disclosure can be freely combined and implemented unless technical contradiction occurs.

Furthermore, the processing described as being performed by a single device may be executed in a shared manner by a plurality of devices. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments in a computer, and reading and executing the program by one or more processors included in the computer. Such a computer program may be provided to the computer by a non-transitory computer-readable storage medium connectable to a computer system bus, or may be provided to the computer via the network. Examples of the non-transitory computer-readable storage media include random disk (such as a magnetic disk (Floppy® disk, hard disk drive (HDD)) and optical disc (CD-ROM, DVD disk, Blu-ray disc, and the like)), read-only memory (ROM), random access memory (RAM), EPROM, EEPROM, magnetic card, flash memory, optical card, and random type of medium suitable for storing electronic instructions.

What is claimed is:

1. A vehicle control interface that connects a vehicle platform including a first computer that performs travel control of a vehicle and an autonomous driving platform including a second computer that performs autonomous driving control of the vehicle, the vehicle control interface comprising:
    a control unit configured to act as a relay between the first computer of the vehicle platform and the second computer of the autonomous driving platform by executing:
        acquiring, from the second computer, a first control command including first data designating a travel track, the first control command being data configured to control the vehicle platform;
        converting the first control command into a second control command that is in a format that is executable by the first computer; and
        transmitting the second control command to the first computer,
    wherein the first data further designates a steering angle,
    the control unit is configured to calculate a range of an amount of change in the steering angle requestable to the first computer based on information acquired from the vehicle platform, and
    the control unit is further configured to notify the second computer of the amount of change in the steering angle requestable to the first computer.

2. The vehicle control interface according to claim 1, wherein the first control command is data that is not specific to the first computer provided in the vehicle, and the second control command is data that is specific to the first computer.

3. The vehicle control interface according to claim 1, wherein when the first control command includes additional data different than the first data, the control unit is configured to discard the additional data without converting the additional data.

4. The vehicle control interface according to claim 1, further comprising:
    a memory configured to store conversion information that is a rule controlling converting the first control command and the second control command,
    wherein the control unit is configured to convert the first control command into the second control command based on the conversion information.

5. The vehicle control interface according to claim 1, wherein when the amount of change in the steering angle designated by the first data exceeds the range requestable to the first computer, the control unit is configured to correct the range of the amount of change in the steering angle in a predetermined range.

6. A vehicle system comprising:
    a vehicle platform including a first computer that performs travel control of a vehicle; and
    a vehicle control interface configured to connect the vehicle platform to an autonomous driving platform including a second computer that performs autonomous driving control of the vehicle, the vehicle control interface including a control unit configured to act as a relay between the first computer of the vehicle platform and the second computer of the autonomous driving platform by executing:
        acquiring, from the second computer, a first control command including first data designating a travel track, the first control command being data for controlling the vehicle platform;
        converting the first control command into a second control command that is in a format that is executable by the first computer; and
        transmitting the second control command to the first computer,
    wherein the first data further designates a steering angle,
    the control unit is configured to calculate a range of an amount of change in the steering angle requestable to the first computer based on information acquired from the vehicle platform, and
    the control unit is further configured to notify the second computer of the amount of change in the steering angle requestable to the first computer.

7. The vehicle control interface according to claim 1, wherein the first control command further includes second data designating acceleration or deceleration.

8. The vehicle system according to claim 6, wherein the first control command further includes second data designating acceleration or deceleration.

9. The vehicle control interface according to claim 1, wherein when the first control command includes additional data different than the first data and related to a command for a vehicle component that is not authorized for access by the autonomous driving platform, the control unit is configured to discard the additional data without converting the additional data.

10. A vehicle control interface that connects a vehicle platform including a first computer that performs travel control of a vehicle and an autonomous driving platform including a second computer that performs autonomous driving control of the vehicle, the vehicle control interface comprising:
    a control unit configured to act as a relay between the first computer of the vehicle platform and the second computer of the autonomous driving platform by executing:
        acquiring, from the second computer, a first control command including at least one of first data designating a travel track and second data designating acceleration or deceleration, the first control command being data configured to control the vehicle platform;
        converting the first control command into a second control command that is in a format that is executable by the first computer; and
        transmitting the second control command to the first computer,
    wherein the first data designates a steering angle and the second data designates the acceleration or deceleration, and the control unit is further configured to:
  calculate a range of the acceleration or deceleration or a range of an amount of change in the steering angle requestable to the first computer based on information acquired from the vehicle platform; and
  notify the second computer of the range of the acceleration or deceleration or the amount of change in the steering angle requestable to the first computer.

* * * * *